United States Patent
Sarwar et al.

(10) Patent No.: US 8,917,591 B2
(45) Date of Patent: Dec. 23, 2014

(54) SYSTEMS AND METHODS FOR PROTECTION OF ADAPTATION LAYER IN A COMMUNICATION NETWORK

(75) Inventors: Muhammad Sakhi Sarwar, Brookfield, CT (US); Zigmunds Andis Putnins, Ridgewood, NJ (US); Jaya Sarup, New City, NY (US); Zanjun Lu, Edison, NJ (US); Nitin Gogate, Montvale, NJ (US); Michael Charles Green, Central Valley, NY (US)

(73) Assignee: Fujitsu Limited, Kawasaki-shi (JP)

( * ) Notice: Subject to any disclaimer, the term of this patent is extended or adjusted under 35 U.S.C. 154(b) by 708 days.

(21) Appl. No.: 13/185,800

(22) Filed: Jul. 19, 2011

(65) Prior Publication Data

US 2013/0022349 A1 Jan. 24, 2013

(51) Int. Cl.
*G06F 11/00* (2006.01)
*H04L 12/24* (2006.01)

(52) U.S. Cl.
CPC ....... *H04L 41/0663* (2013.01); *H04J 2203/006* (2013.01); *H04J 2203/0085* (2013.01)
USPC ................. 370/217; 370/220; 398/2

(58) Field of Classification Search
CPC ............ H04L 41/0663; H04L 41/0668; H04L 12/40189; H04L 49/357; H04L 43/0811; H04L 45/22; H04L 45/28; H04L 12/4641; H04L 12/467; H04J 2203/0085; H04J 2203/006; H04J 3/085; H04J 3/14

USPC ..................... 370/216–220; 714/48
See application file for complete search history.

(56) References Cited

U.S. PATENT DOCUMENTS

| | | | | |
|---|---|---|---|---|
| 8,553,530 | B1* | 10/2013 | Dufour et al. | 370/217 |
| 2005/0243713 | A1* | 11/2005 | Okuda | 370/216 |
| 2006/0227704 | A1* | 10/2006 | Nakagawa et al. | 370/217 |
| 2007/0183314 | A1* | 8/2007 | Li et al. | 370/217 |
| 2007/0260940 | A1* | 11/2007 | Hekmat | 714/48 |
| 2008/0259786 | A1* | 10/2008 | Gonda | 370/218 |
| 2010/0177630 | A1* | 7/2010 | He et al. | 370/217 |
| 2010/0293408 | A1* | 11/2010 | Shannon et al. | 714/4 |
| 2011/0075554 | A1* | 3/2011 | Holness | 370/228 |

* cited by examiner

*Primary Examiner* — Edan Orgad
*Assistant Examiner* — Ivan O Latorre
(74) *Attorney, Agent, or Firm* — Baker Botts L.L.P.

(57) ABSTRACT

A method may include: (i) provisioning a first network-side interface of a first plug-in unit and a second network-side interface of a second plug-in unit as members of a network-side protection group, the first plug-in unit and the second plug-in unit integral to an adaptation layer network element; (ii) provisioning a first client-side interface of the first plug-in unit and a second client-side interface of the second plug-in unit as members of a client-side protection group; (iii) designating one of the first and second network-side interface as an active network-side interface of the network-side protection group; and (iv) designating one of the first second client-side interface as an active client-side interface of the client-side protection group, such that traffic ingressing on the active network-side interface may egress on the active client-side interface and traffic ingressing on the active client-side interface may egress on the active network-side interface.

21 Claims, 5 Drawing Sheets

SYSTEMS AND METHODS FOR PROTECTION OF ADAPTATION LAYER IN A COMMUNICATION NETWORK

TECHNICAL FIELD OF THE DISCLOSURE

The present disclosure relates generally to networked communications and, more particularly, to systems and method for protection of an adaptation layer in a communication network.

BACKGROUND

A communication network may include network elements that route datagrams (e.g., frames, packets) through the network. Some network elements may include a distributed architecture, wherein datagram processing may be distributed among several subsystems of the network element (e.g., line cards, switches, and traffic managers).

In many instances, communication networks may employ link aggregation. Link aggregation (e.g., IEEE 802.1AX-2008) may generally describe the practice of using multiple network cables or ports in parallel to increase the link speed beyond the limits of any one single cable or port. Link aggregation may also be used to provide fault protection by increasing redundancy for higher availability. In link aggregation, a group or set of ports may be combined and represented as a single logical port to other components of the network system. Various switching elements of the network system may "see" the aggregated ports (known as a "link aggregation group" or "LAG") as a single logical communication port in the routing tables or databases of network elements external to the LAG.

In addition, to ensure high reliability and availability in communications networks, protection switching is often used. When implemented, protection switching typically provides a primary or "working" path for a network and a redundant or "protection" path for the network. Accordingly, each path of a protection group may be monitored, and if a failure is detected on the working path, network traffic may be switched to the protection path. A LAG, because it includes a group of ports, may be used to perform protection switching, and is so often used to provide protection for Ethernet interfaces. Other protection schemes in communications networks include unidirectional path-switched ring (UPSR), birectional path-switched ring (BPSR), automatic protection switching (APS), or others.

A particular communication network may include a plurality of network elements for carrying Ethernet traffic between two or more clients via a synchronous optical network (SONET). FIG. 1 depicts an example of a traditional implementation of such a communication network 1. As shown in FIG. 1, communication network may include a plurality of network elements 2, each network element 2 providing an adaptation layer interface 110a between Ethernet client interfaces 7 and SONET ports 6. SONET ports 6 may be coupled to a protected SONET network 3. Generally speaking, a network element 2 may perform datagram segmentation, reassembly, and other tasks in order to convert Ethernet packets received at an Ethernet client interface 7 to SONET frames for communication via protected SONET network 3, and vice versa. As depicted in FIG. 1, a network element 2 may include a plurality of plug-in units (PIUs) 4. A PIU 4 may have plug-in terminals so that some or all electrical and/or optical connections of the PIU 4 can be made engaging the unit with a suitable socket of network element 2, and may generally be configured to forward datagrams between Ethernet client interface 7 and protected SONET network 3. In some embodiments, a PIU 4 may be configured to perform datagram segmentation, reassembly, and other tasks in order to convert Ethernet packets received at an Ethernet client interface 7 to SONET frames for communication via protected SONET network 3, and vice versa. A PIU 4 may include a port 5 configured to serve as a physical interface between its associated PIU 4 and Ethernet client interface 7. Similarly, a PIU 4 having a port 5 may be configured to serve as a physical interface between its associated network element 2 and protected SONET network 3.

In traditional implementation such as those depicted in FIG. 1, Ethernet client interfaces 7 may be protected (e.g., enabled for redundancy in the event of failure) using link aggregation and ports 5 comprising an Ethernet client interface 7 may comprise members of a link aggregation group 6. In addition, protected SONET network 3 may be protecting using UPSR, BPSR, APS, or any other suitable protection scheme. However, as seen in FIG. 1, adaptation layer interface 110a may comprise a single point of failure (e.g., by way of a failure of a PIU 4), thus preventing end-to-end protection in network 1. Traditional solutions to this problem include including a redundant network-side port 5 having another transmission path, ensuring that at least one of the network-side ports 5 has a path to the SONET network 3. However, such a solution results in doubling the bandwidth requirements of a network element.

SUMMARY

According to one embodiment, a method may include provisioning a first network-side interface integral to a first plug-in unit and a second network-side interface integral to a second plug-in unit as members of a network-side protection group, the first plug-in unit and the second plug-in unit integral to a network element. The method may further include provisioning a first client-side interface integral to the first plug-in unit and a second client-side interface integral to the second plug-in unit as members of a client-side protection group. The method may also include designating one of the first network-side interface and the second network-side interface as an active network-side interface of the network-side protection group. The method may additionally include designating as a standby network-side interface of the network-side protection group the network-side interface not designated as the active network-side interface. Moreover, the method may include designating one of the first client-side interface and the second client-side interface as an active client-side interface of the client-side protection group. The method may also include designating as a standby client-side interface of the client-side protection group the client-side interface not designated as the active client-side interface. As a result, traffic ingressing on the active network-side interface may egress on the active client-side interface and traffic ingressing on the active client-side interface may egress on the active network-side interface.

Certain embodiments of the invention may provide one or more technical advantages. For example, methods and systems disclosed herein may provide for end-to-end protection in a communication network.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
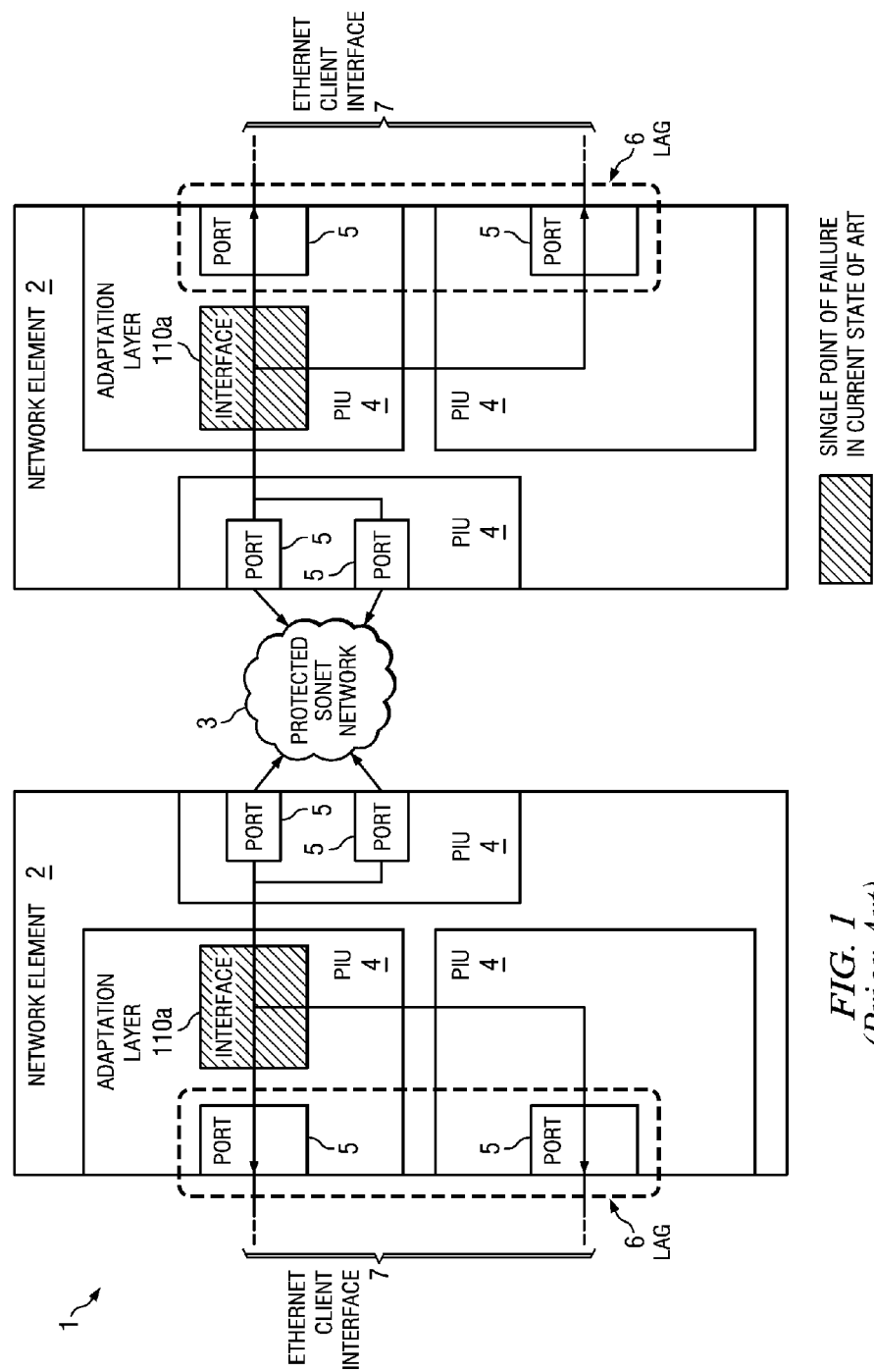
FIG. 1 illustrates a block diagram of a traditional communication network.

FIGS. 2-5 illustrates a block diagram of an example communication network 10, in accordance with certain embodiments of the present disclosure. In certain embodiments, network 10 may comprise a network configured to provide for Ethernet datagram communication via synchronous optical networking (SONET). Network 10 may include one or more transmission media 12 operable to transport one or more signals communicated by components of network 10. The components of network 10, coupled together by transmission media 12, may include a plurality of network elements 102 and a protected SONET network 101. Network 10 may be used in a short-haul metropolitan network, a long-haul intercity network, or any other suitable network or combination of networks.

Each transmission medium 12 may include any system, device, or apparatus configured to communicatively couple network elements 102 to each other, protected SONET network 101, and/or client interfaces 110b, and communicate information between network elements 102 and protected SONET network 101 and between network elements 102 and client interfaces 110b. For example, a transmission medium 12 may include an optical fiber, an Ethernet cable, a T1 cable, a WiFi signal, a BLUETOOTH signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream. As used herein, the term "datagram" may refer to a frame, packet, or other data structure for transmission of traffic.

Protected SONET network 101 may include any system configured to switch, forward, and/or route traffic between network elements 102. Protected SONET network 101 may comprise a plurality of optical nodes each configured to provide switching, forwarding, and/or routing functionality. As its name indicates, protection SONET network 101 may employ a protection methodology to provide redundancy protection in the event of a failure. To provide protection, protected SONET network 101 may employ unidirectional path-switched ring (UPSR), birectional path-switched ring (BPSR), automatic protection switching (APS), or another suitable protection scheme.

A client interface 110b may provide an interface between a network element 102 and clients (e.g., customers) of a network provider. In addition, protected SONET network 101 may comprise a provider network.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Generally speaking, a network element 102 may perform datagram segmentation, reassembly, and other tasks in order to convert Ethernet packets received at a client interface 110b to SONET frames for communication via protected SONET network 101, and vice versa. As shown in FIGS. 2-5, each network element 102 may include a management module 108, a plurality of plug-in units (PIU) 106, a mate-link 114 including one or more inter-PIU links, and a SONET line card 111.

A PIU 106 may include any system, device, or apparatus having plug-in terminals so that some or all electrical connections of the PIU 106 can be made engaging the unit with a suitable socket of network element 102. A PIU 106 may generally be configured to forward datagrams between a client and a SONET line card 111 via interfaces 110. In some embodiments, a PIU 106 may be configured to perform datagram segmentation, reassembly, and other tasks in order to convert Ethernet packets received at a client interface 110b to SONET frames for communication via protected SONET network 101, and vice versa. As shown in FIGS. 2-5, a PIU 106 may include a network-side interface 110a and a client-side interface 110b.

A network-side interface 110a may include any suitable system, apparatus, or device configured to serve as an interface between a network element 102 and SONET line card 111. A client-side interface 110b may include any suitable system, apparatus, or device configured to serve as an interface between a network element 102 and a transmission medium 12 communicatively coupling such network element 102 to a client. An interface 110 (e.g., a network-side interface 110a and/or a client-side interface 110b) may enable its associated network element 102 to communicate with protected a SONET line card 111 or a client, as applicable, using any suitable transmission protocol and/or standard. An interface 110 may be implemented using hardware, software, or any combination thereof. For example, an interface 110 may comprise an Ethernet port, an optical port, or any other suitable port.

Client-side interfaces 110b of a network element 102 and their corresponding transmission media may be grouped into a client-side protection group 116. A client-side protection group 116 may provide path redundancy in the event of a link failure (e.g., a failure of transmission media 12, a client-side interface 110b, or another component of a network 10) that prevents communication between two points via a particular client-side interface 110b or transmission medium 12 of the client-side protection group 116. For example, a particular client-side interface 110b and associated transmission medium 12 of a client-side protection group 116 may be designated as an active member of the client-side protection group 116 while other client-side interfaces 110b and transmission media 12 are designated as standby members. In the event of a failure preventing communication via the active client-side interface 110b and/or transmission medium 12, a protection switch may occur whereby a standby client-side interface 110b and transmission medium 12 of the client-side protection group 116 is re-designated as active. A client-side protection group 116 may be implemented in accordance with any suitable protocol and/or standard. In some embodiments, a client-side protection group 116 may be implemented as a link aggregation group (LAG). A LAG may include any suitable number of member client-side physical interfaces 110 and may combine its member ports using link aggregation such that the member ports are represented as a single logical port to components of network 10 external to the LAG.

Network-side interfaces 110a of a network element 102 and their corresponding transmission media may be grouped into a network-side protection group 118, which may server as an adaptation layer, as shown in FIGS. 2-5. A network-side protection group 118 may provide path redundancy in the event of a link failure (e.g., a failure of transmission media 12, a network-side interface 110a, or another component of a network 10) that prevents communication between two points via a particular network-side interface 110a or transmission medium 12 of the network-side protection group 118. For example, a particular network-side interface 110a and associated transmission medium 12 of a network-side protection group 118 may be designated as an active member of the network-side protection group 118 while other network-side interfaces 110a and transmission media 12 are designated as standby members. In the event of a failure preventing communication via the active network-side interface 110a and/or transmission medium 12, a protection switch may occur whereby a standby network-side interface 110a and transmission medium 12 of the network-side protection group 118 is re-designated as active. A network-side protection group 118 may be implemented in accordance with any suitable protocol and/or standard, including without limitation the protection scheme discussed below with reference to the operation of management module 108.

A management module 108 may include any system, device, or apparatus configured to maintain protection groups 116 and 118, including configuring various interfaces 110 as active or standby interfaces in order to provide redundancy protection for a network element 102. For example, management module 108 may designate one network-side interface 110a of a network element 102 as active and other network-side interfaces 110a of the network element as standby. Similarly, management module 108 may designate one client-side interface 110b of a network element 102 as active and other client-side interfaces 110b of the network element as standby. In addition, a management module may provision a path within a network element 102 between a then-presently active network-side interface 110a and a then-presently active client-side interface 110b via one or more PIUs 106 and, if necessary, a mate link 114. During operation, a management module 108 may perform a protection switch to provision a new active network-side interface 110a different from the then-present network-side interface 110a, and/or provision a new active client-side interface 110b different from the then-present client-side interface 110b. Such protection switch may occur in the event of a failure or other event that may prevent traffic communication to and/or from network element 102 using the then-present active interfaces 110 (e.g., failure of an active interface 110, failure of a transmission medium 12 interfacing with an active interface 110, failure of a PIU 106 upon which an active interface is located, etc.).

A SONET line card 111 may include any system, device, or apparatus configured to serve as a communication interface between network-side interfaces 110a and protected SONET network 101. As depicted in FIGS. 2-5, a SONET line cars may include a plurality of interfaces 110c, allowing for redundant paths to be established between network elements 102. A SONET line card interface 110c may enable its associated network element 102 to communicate with protected SONET network 101 and/or a network-side interface 110a, using any suitable transmission protocol and/or standard. An interface 110 may be implemented using hardware, software, or any combination thereof. For example, an interface 110 may comprise an Ethernet port, an optical port, or any other suitable port. SONET line card 111 may be an integral part of a SONET switch 1112, as shown in FIGS. 2-5.

Although FIGS. 2-5 depict management modules 108 as independent of other components of their respective network elements 102, in some embodiments one or management modules may reside on PIUs 106 and/or other components of network elements 102. Management modules 108 may be implemented in hardware, firmware, or software.

Figure 2:
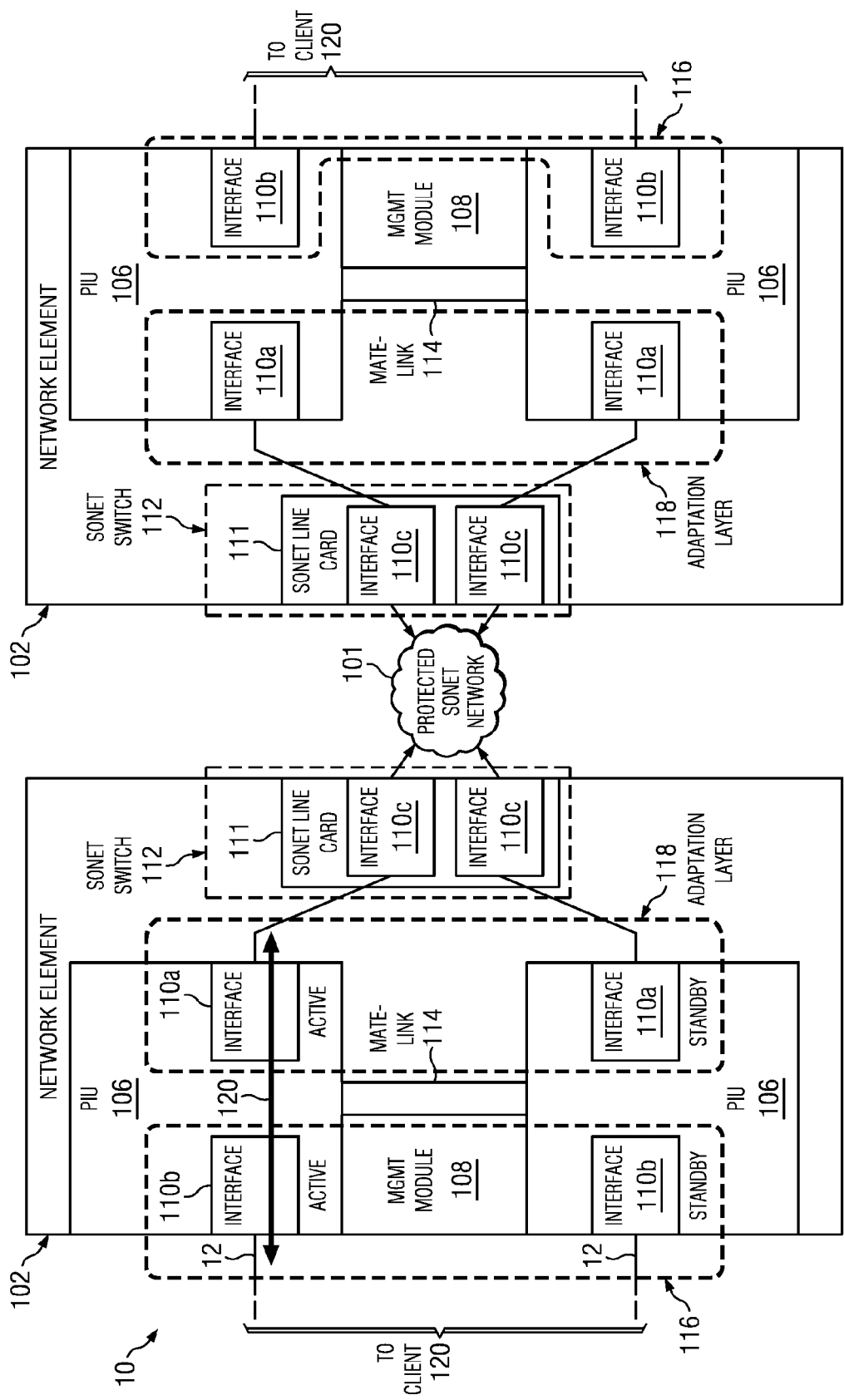
FIGS. 2-5 illustrate block diagrams of an example communication network, in accordance with certain embodiments of the present disclosure.
Figure 3:
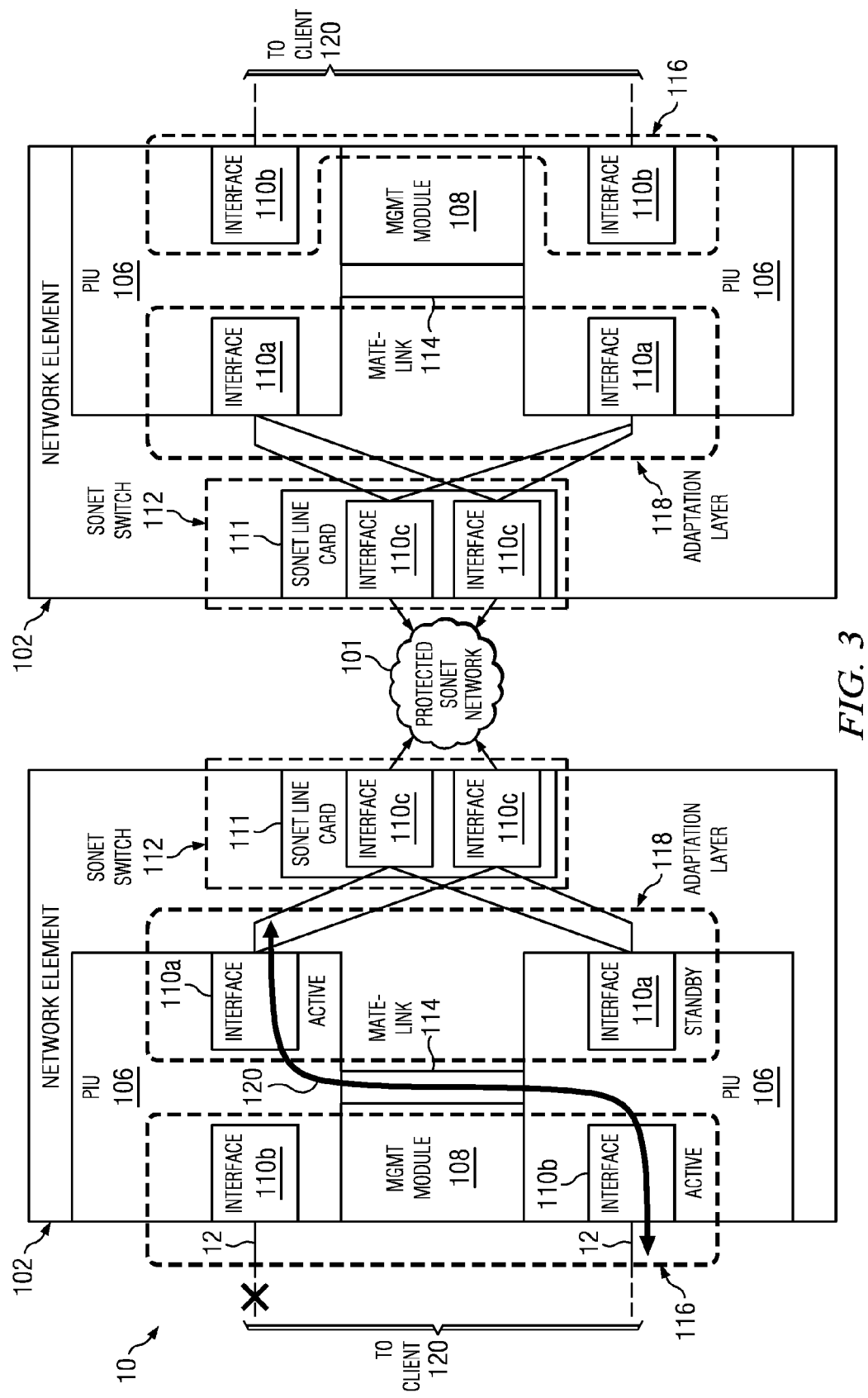
Figure 4:
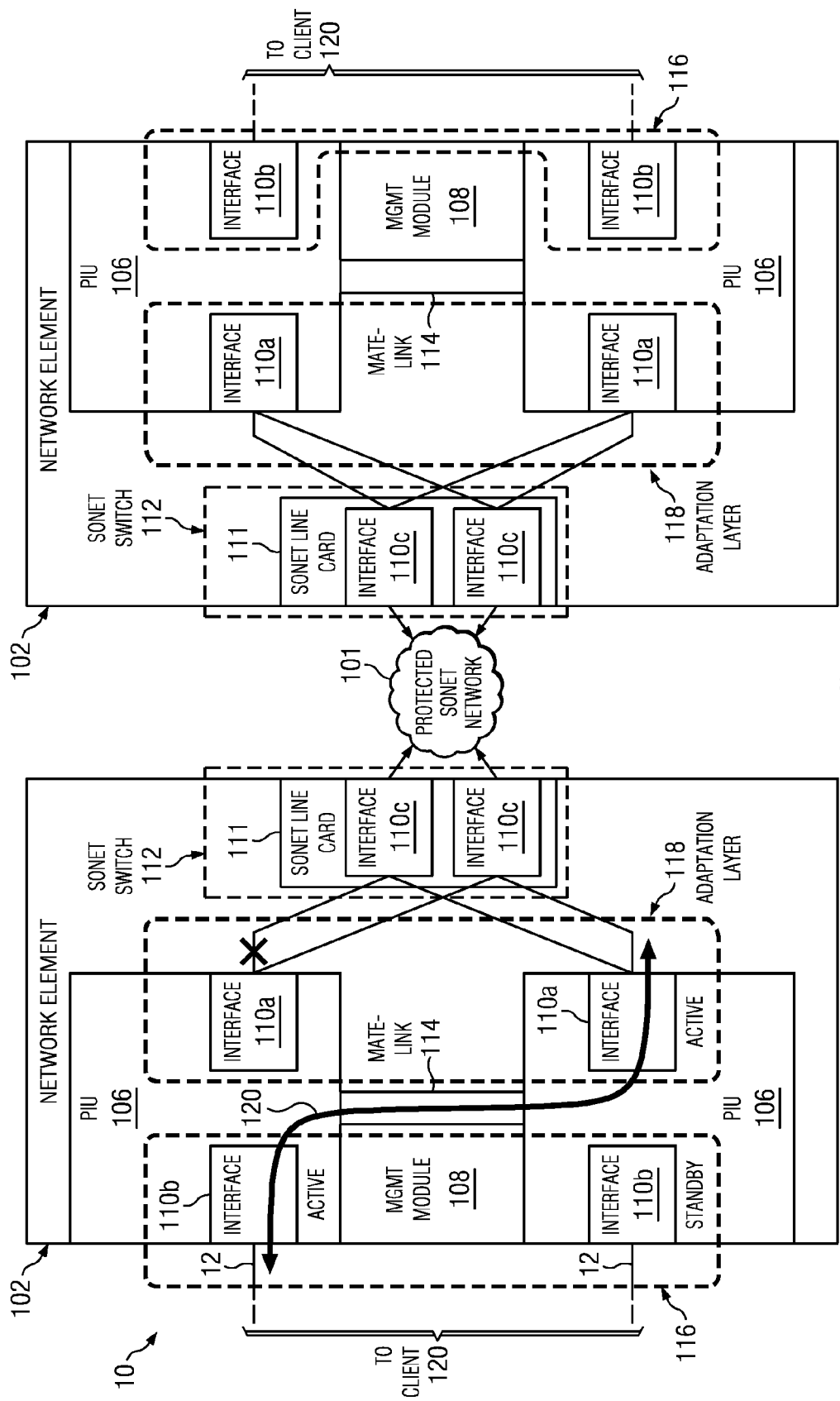
Figure 5:
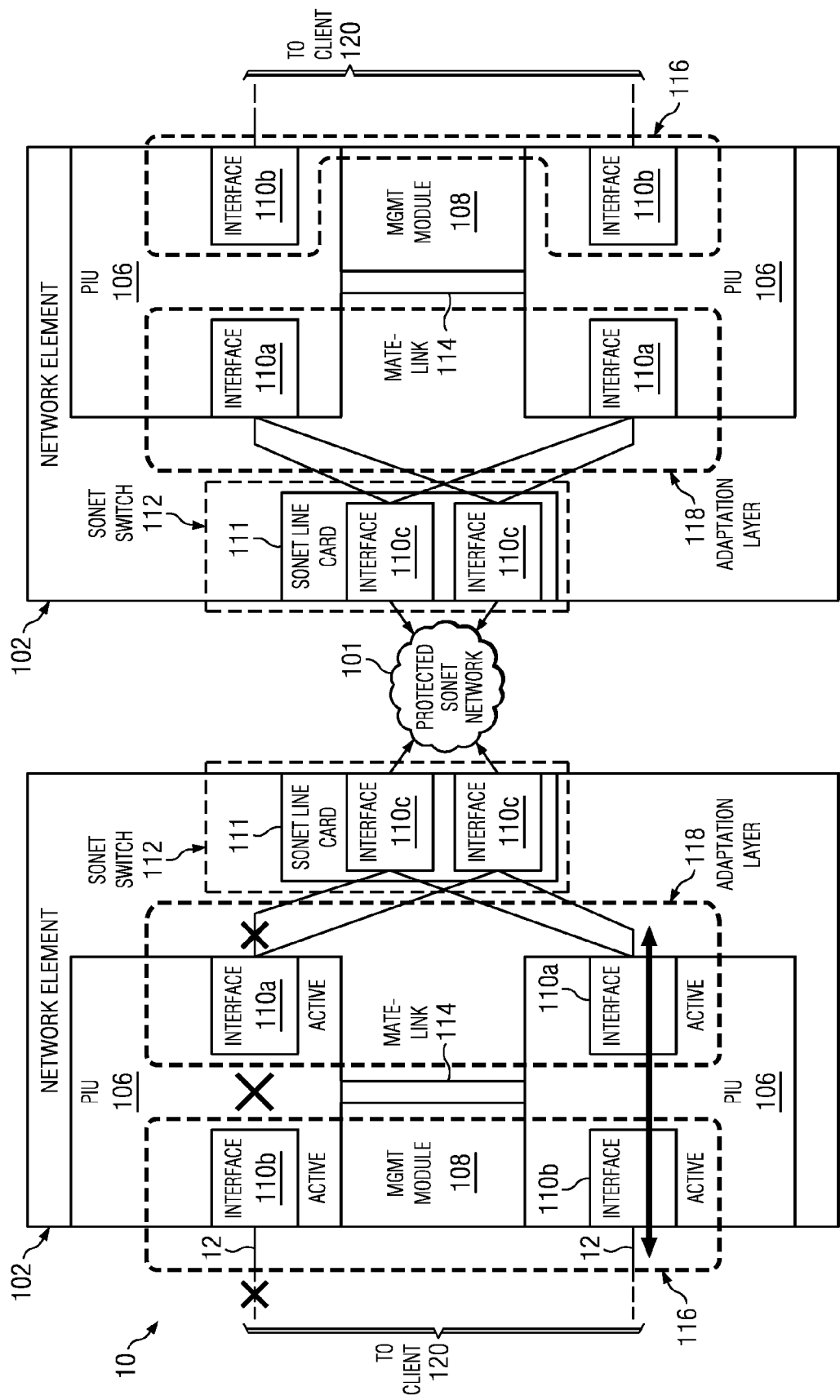

Various protection switching events are depicted in FIGS. 2-5. FIG. 2 depicts a network element 102 during "normal" operation in which no failures are present preventing communication via any interface 110 of the network element 102. Accordingly, management module 108 of the particular network element 102 may designate any of network-side interfaces 110a as the active network-side interface 110a, and any of the client-side interfaces 110b, as the active client-side interface 110b, thereby establishing a path 120 for communication of traffic through network element 102. As shown in FIG. 3, in the event of a protection switching event occurring that prevents communication via the then-present active client-side interface 110b depicted in FIG. 2 (e.g., a failure of the then-present active client-side interface 110b or a transmission medium 12 coupled thereto, or other suitable failure event), management module 108 may initiate a protection switch re-designating the other client-side interface 110b from standby to active, thus providing a redundant communication path 120 through the network element 102. Alternatively or in addition, as shown in FIG. 4, in the event of a protection switching event occurring that prevents communication via the then-present active network-side interface 110a depicted in FIG. 2 (e.g., a failure of the then-present active network-side interface 110a or a transmission medium 12 coupled thereto, or other suitable failure event), management module 108 may initiate a protection switch re-designating the other network-side interface 110a from standby to active, thus providing a redundant communication path 120 through the network element 102. Alternatively or in addition, as shown in FIG. 5, in the event of a protection switching event occurring that prevents communication via both the then-present active network-side interface 110a and the then-present active client-side interface 110b depicted in FIG. 2 (e.g., a failure of the then-present active client-side interface 110b or a transmission medium 12 coupled thereto coupled with a failure of the then-present active network-side interface 110a or a transmission medium 12 coupled thereto, or a failure of a PIU 106 upon which the active network-side interface 110a and client-side network interface 110b reside), management module 108 may initiate a protection switch re-designating the other network-side interface 110a from standby to active, thus providing a redundant communication path 120 through the network element 102.

To support the above-described protection of a network element 102, an element of protected SONET network 101 (e.g., a SONET switch fabric or other suitable element) may be configured to, when communicating traffic to a network element 102, broadcast such traffic to all interfaces 110a of a network-side protection group 118. The active interface 110a of the network-side protection group 110 may further forward the traffic, while the standby interfaces 110a of the network-side protection group 118 may simply ignore or drop broadcast traffic received from protected SONET network 101.

Modifications, additions, or omissions may be made to network 10 without departing from the scope of the disclosure. The components and elements of network 10 described may be integrated or separated according to particular needs.

Moreover, the operations of network 10 may be performed by more, fewer, or other components.

A component of network 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the invention. The components of network 10 may be integrated or separated. Moreover, the operations of network 10 may be performed by more, fewer, or other components. Additionally, operations of network 10 may be performed using any suitable logic. As used in this document, "each" refers to each member of a set or each member of a subset of a set.

Certain embodiments of the invention may provide one or more technical advantages. A technical advantage of one embodiment may be that alarm indication signals that typically originate from maintenance end points may be transmitted in the event that equipment upon which the maintenance end points have experienced a fault, thus reducing the occurrence of unnecessary alarms.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A network element comprising:
    a first plug-in unit comprising:
        a first client-side interface; and
        a first network-side interface communicatively coupled to the first client-side interface;
    a second plug-in unit communicatively coupled to the first plug-in unit via a mate link, the second plug-in unit comprising:
        a second client-side interface; and
        a second network-side interface communicatively coupled to the first client-side interface; and
    a management module configured to:
        provision the first network-side interface and the second network-side interface as members of a network-side protection group;
        provision the first client-side interface and the second client-side interface as members of a client-side protection group;
        designate one of the first network-side interface and the second network-side interface as an active network-side interface of the network-side protection group;
        designate as a standby network-side interface of the network-side protection group the network-side interface not designated as the active network-side interface;
        designate one of the first client-side interface and the second client-side interface as an active client-side interface of the client-side protection group; and
        designate as a standby client-side interface of the client-side protection group the client-side interface not designated as the active client-side interface;
        such that traffic ingressing on the active network-side interface egresses on the active client-side interface and traffic ingressing on the active client-side interface egresses on the active network-side interface.

2. A network element according to claim 1, the client-side protection group comprising a link aggregation group.

3. A network element according to claim 1, the client-side protection group configured to interface with an Ethernet network.

4. A network element according to claim 1, the network-side protection group configured to interface with a synchronous optical network.

5. A network element according to claim 4,
    the active network-side interface further configured to:
        receive traffic broadcasted from the synchronous optical network to each of the active network-side interface and the standby network-side interface; and
        forward the traffic to the active client-side interface; and
    the standby network-side interface further configured to:
        receive traffic broadcasted from the synchronous optical network to each of the active network-side interface and the standby network-side interface; and
        drop the traffic.

6. A network element according to claim 1, the management module further configured to, in response to an event preventing communication of traffic via the active client-side interface, re-designate the standby client-side interface as the active client-side interface.

7. A network element according to claim 1, the management module further configured to, in response to an event preventing communication of traffic via the active network-side interface, re-designate the standby network-side interface as the active network-side interface.

8. A communication network comprising:
    a first network element providing a first client network interface; and
    a second network element providing a second client network interface configured to communicatively couple to the first network element via a synchronous optical network such that client traffic may be communicated between the first client network interface and the second client network interface, the second network element comprising;
        a first plug-in unit comprising:
            a first client-side interface; and
            a first network-side interface communicatively coupled to the first client-side interface;
        a second plug-in unit communicatively coupled to the first plug-in unit via a mate link, the second plug-in unit comprising:
            a second client-side interface; and
            a second network-side interface communicatively coupled to the first client-side interface; and a management module configured to:
provision the first network-side interface and the second network-side interface as members of a network-side protection group;
provision the first client-side interface and the second client-side interface as members of a client-side protection group;
designate one of the first network-side interface and the second network-side interface as an active network-side interface of the network-side protection group;
designate as a standby network-side interface of the network-side protection group the network-side interface not designated as the active network-side interface;
designate one of the first client-side interface and the second client-side interface as an active client-side interface of the client-side protection group; and
designate as a standby client-side interface of the client-side protection group the client-side interface not designated as the active client-side interface;
such that traffic ingressing on the active network-side interface egresses on the active client-side interface and traffic ingressing on the active client-side interface egresses on the active network-side interface.

9. A communication network according to claim 8, the client-side protection group comprising a link aggregation group.

10. A communication network according to claim 8, first client network interface and the second client network interface each configured to interface to an Ethernet network.

11. A communication network according to claim 8, the network-side protection group configured to interface with the synchronous optical network.

12. A communication network according to claim 11, the active network-side interface further configured to:
receive traffic broadcasted from the synchronous optical network to each of the active network-side interface and the standby network-side interface; and
forward the traffic to the active client-side interface; and
the standby network-side interface further configured to:
receive traffic broadcasted from the synchronous optical network to each of the active network-side interface and the standby network-side interface; and
drop the traffic.

13. A communication network according to claim 8, the management module further configured to, in response to an event preventing communication of traffic via the active client-side interface, re-designate the standby client-side interface as the active client-side interface.

14. A communication network according to claim 8, the management module further configured to, in response to an event preventing communication of traffic via the active network-side interface, re-designate the standby network-side interface as the active network-side interface.

15. A method comprising:
provisioning a first network-side interface integral to a first plug-in unit and a second network-side interface integral to a second plug-in unit as members of a network-side protection group, the first plug-in unit and the second plug-in unit integral to a network element;
provisioning a first client-side interface integral to the first plug-in unit and a second client-side interface integral to the second plug-in unit as members of a client-side protection group;
designating one of the first network-side interface and the second network-side interface as an active network-side interface of the network-side protection group;
designating as a standby network-side interface of the network-side protection group the network-side interface not designated as the active network-side interface;
designating one of the first client-side interface and the second client-side interface as an active client-side interface of the client-side protection group; and
designating as a standby client-side interface of the client-side protection group the client-side interface not designated as the active client-side interface;
such that traffic ingressing on the active network-side interface egresses on the active client-side interface and traffic ingressing on the active client-side interface egresses on the active network-side interface.

16. A method according to claim 15, the client-side protection group comprising a link aggregation group.

17. A method according to claim 15, further comprising configuring the client-side protection group to interface with an Ethernet network.

18. A method according to claim 15, further comprising configurating the network-side protection group to interface with a synchronous optical network.

19. A method according to claim 18, further comprising:
receiving traffic at the active network-side interface broadcasted from the synchronous optical network to each of the active network-side interface and the standby network-side interface; and
forwarding the traffic from the active network side interface to the active client-side interface;
receiving traffic at the standby network-side interface broadcasted from the synchronous optical network to each of the active network-side interface and the standby network-side interface; and
dropping the traffic received at the standby network-side interface.

20. A method according to claim 15, further comprising re-designating the standby client-side interface as the active client-side interface in response to an event preventing communication of traffic via the active client-side interface.

21. A method according to claim 15, further comprising re-designating the standby network-side interface as the active network-side interface in response to an event preventing communication of traffic via the active network-side interface.

* * * * *